US006810239B2

(12) United States Patent
Riddle

(10) Patent No.: US 6,810,239 B2
(45) Date of Patent: Oct. 26, 2004

(54) AUTOMATED TRANSMITTER COMBINER MONITORING SYSTEM AND METHOD OF USING SAME

(75) Inventor: Steven M. Riddle, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 727 days.

(21) Appl. No.: 09/826,517

(22) Filed: Apr. 5, 2001

(65) Prior Publication Data

US 2002/0146990 A1 Oct. 10, 2002

(51) Int. Cl.[7] .............................................. H04B 17/00
(52) U.S. Cl. ................................ 455/115.1; 455/67.13; 455/103
(58) Field of Search .......................... 455/115.1, 115.3, 455/115.4, 500, 507, 513, 67.11, 67.13, 553.1, 103

(56) References Cited

U.S. PATENT DOCUMENTS 4,032,920 A * 6/1977 Martin et al. ............... 342/413
4,502,762 A * 3/1985 Anderson .................... 359/488

* cited by examiner

Primary Examiner—Tony T. Nguyen

(57) ABSTRACT

An automated transmit combiner monitoring system (100) for an RF radio transmitter system includes a transmitter (101) for providing a primary source of radio frequency (RF) energy and an isolator network (105,107) for isolating the output of the transmitter (101) from secondary sources of RF energy. A transmitter combiner junction (109) is used for enabling the transmitter (101) to provide RF energy to a single antenna (111) while a dummy load (113) is used for loading any unwanted RF energy from the transmitter (101) that is received from the isolator network (103,105). An RF detector (115) is then used for measuring RF energy from the dummy load and an alarm reporting device (119) then monitors the system to provide an alert based on RF energy measured outside a predetermined threshold.

12 Claims, 1 Drawing Sheet

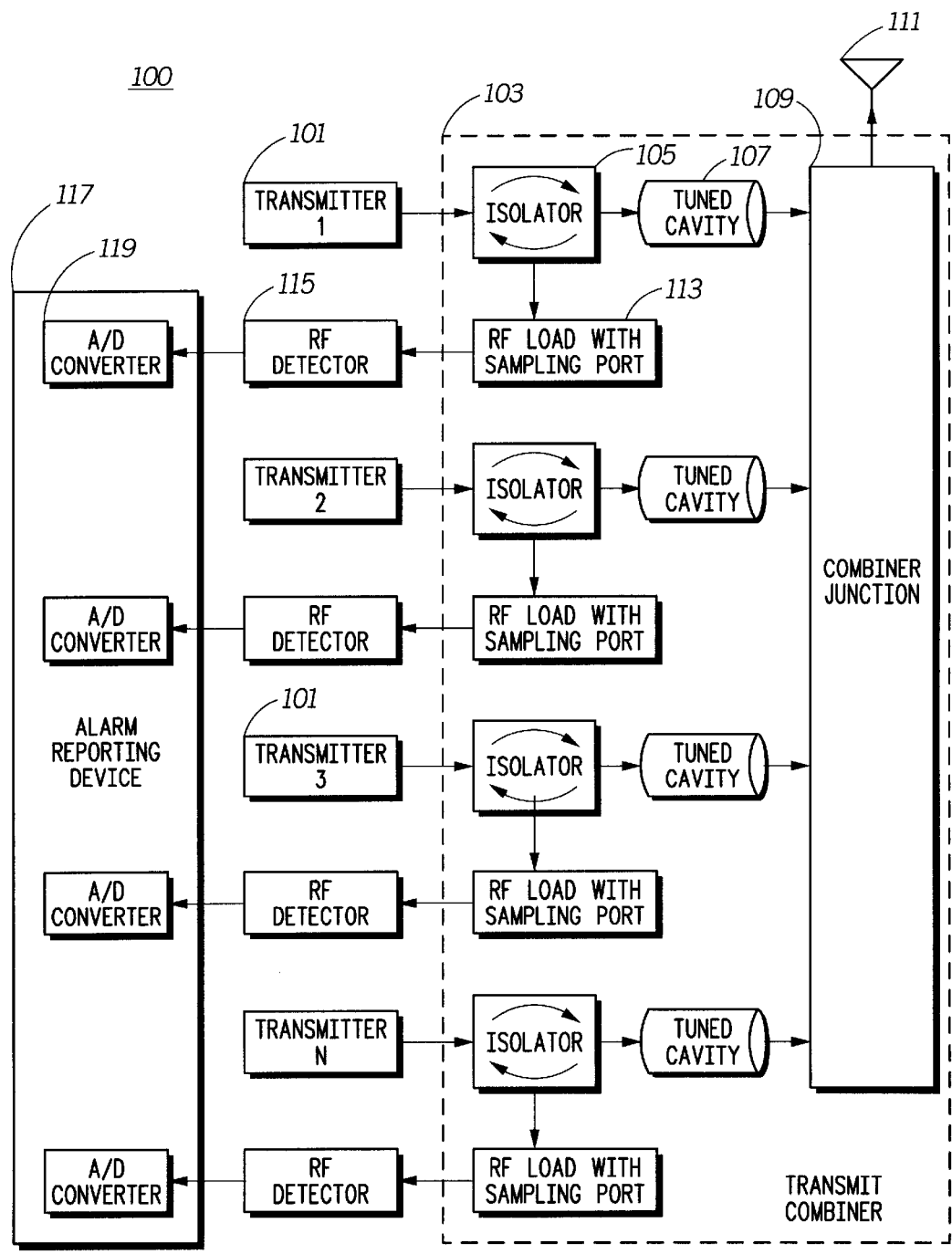

AUTOMATED TRANSMITTER COMBINER MONITORING SYSTEM AND METHOD OF USING SAME

TECHNICAL FIELD

This invention relates in general to the monitoring of radio frequency (RF) high power radio systems and more specifically to the monitoring of a transmitter combiner radio system and associated antenna network.

BACKGROUND

Many types of two-way radio system configurations are used today for all types of purposes. Radio systems can be either private or public and can be utilized for applications in public safety, law enforcement, private dispatch and military. Often these systems are very complex and require some type of monitoring system to continually test and evaluate system performance in order to alert the system operator in the event of a pending failure. The most common failures in this type of complex radio system occur when a transmitter combiner and one of its cavity bandpass filters is out of tolerance or the antenna network degrades.

When these devices are out of tolerance, the systems effective radiated power is reduced thus the coverage on that channel or group of channels degraded. A de-tuned combiner cavity is a typical example of system degradation where a portion of the forward power is reflected back to the isolator, which dissipates the energy in the RF load and only a small fraction of that reflected power is passed back to the combiners input port too small for the fault to be detected by the transmitter. The transmitters directional coupler cannot detect this problem until the isolator is degraded (isolator is heat damaged and will need replacement) to the point where a significant amount of energy is passed back out the combiner's input port. A directional coupler on the combiner output will not detect even substantial reductions in output power on a single channel with respect to the total output power of the combiner and due to the random nature of the channel activity.

The current technique of inserting a directional coupler onto the input and output ports of a transmitter combiner is ineffective as stated previously. A directional coupler on the combiners input port duplicates the repeater's built in power monitor, cannot detect any problem past the combiner's isolator, has insertion loss, and creates additional points of failure. The input port coupler can only provide additional information in the unlikely condition where the coax becomes lossy without reflected power to the transmitter.

A directional coupler on the combiner's output port typically adds approximately 0.6 dB of loss to the transmit network and is very limited in its diagnostic abilities. The forward power out of the combiner is continually changing as the number of keyed transmitters varies randomly. This requires a summing and comparison logic circuit to adjust the forward power alarm threshold to be anywhere close to accurate, which is rarely done. Normally the alarm thresholds are set substantially high to avoid false alarms that it will only detect catastrophic failures where the combiner's insertion loss approaches 50%. The same holds true for the reflected power threshold or it needs to be set substantially high to accommodate with all transmitters keyed condition.

With the reflection threshold set that high to avoid false alarms, the directional coupler may only indicate a problem when most of the stations are keyed or with a catastrophic failure of the antenna system. The users normally notice the drastic reduction in coverage due to antenna failure and call for service thus minimizing the effectiveness of directional couplers to monitor transmitter combiners and associated antenna network.

Thus, there is a need to provide a monitoring system that can detect the most probable failure in a transmitter combiner and antenna network before additional damage of an isolator or other associated equipment can occur. With transmitter combiners and antenna systems being the weakest links in today's high power radio systems, and with higher system reliability required, the need exists to provide an adequate monitoring system to evaluate the relative performance and efficiency of those subsystems. Standard approaches used in the field either duplicate an existing function or they provide unusable readings during normal system operation. Existing monitoring methods cause serious problems since the insertion losses associated with the directional coupler reduces the performance of the radio system. Moreover, power detectors in the RF transmit path give rise the increased probability of component failure and IM (Inter-Modulation) production thus lowering the system reliability and performance. Hence, some additional system and method is required to avoid these inherent problems in the generally accepted testing methods.

BRIEF DESCRIPTION OF THE DRAWINGS

The FIGURE is a block diagram illustrating an automated transmit combiner monitoring system as used with a repeater/transmitter two-way radio system according to the preferred embodiment of the invention.

DETAILED DESCRIPTION OF THE PREFERRED EMBODIMENT

Referring now to the FIGURE, the transmit combiner monitoring system 100 includes a plurality of transmitters 101 whose RF output is directed to a transmit combiner 103. Each transmitter, i.e. transmitter 1 to N, typically will generate RF energy at a different frequency at some desired power level for that specific transmitter.

The transmit combiner 103 is comprised of a plurality of isolators 105, a plurality of tuned cavities 107 and a combiner junction 109. Each transmitter 101 has an associated isolator 105 and tuned cavity 107. The RF energy generated by transmitter 101 is directed to its respective isolator 105 where the isolator 105 works to prevent reflected RF energy from a mismatched antenna or improperly tuned cavity 107 from damaging the power amplifier stage (not shown) of the transmitter 101. RF energy passes from the isolator 103 to a tuned cavity 107. The tuned cavity 107 acts as a matching network to match the output impedance of the isolator 105 to a combiner junction 109. The tuned cavity 107 is typically comprised of a RF resonate pass cavity enabling an efficient transfer of RF energy form the isolator 105 to the combiner junction 109 at the resonate frequency.

The combiner junction 109 is used to enable a plurality of transmitters 101 collectively share and utilize a single antenna system 111. As is well known in the art, the antenna system 111 can be any type of antenna the will be accommodate any of the various frequency combinations used by transmitters 101. The advantage of the combiner junction 109 is that it allows a plurality of transmitters to simultaneously share one antenna system without the need to provide an antenna for each transmitter.

Typically any mismatch or system component malfunction may cause a high voltage standing wave radio (VSVR) at the antenna system 111 will be presented back to the isolator 105. The isolator 105 shunts this reflected RF energy to an RF load 113 and away from the power amplifier of transmitter 101. The RF load 113 is typically comprised of a 50-ohm non-reactive load generally referred to as a "dummy" load. The dummy load dissipates this reflected RF energy. The RF load 113 further comprises a sampling port for connection of power monitoring equipment for measuring RF energy present at the RF load.

An RF detector 115 is connected to the sampling port in order to measure and detect RF energy present at the RF load 113. The RF detector 115 rectifies the RF voltage and the resultant DC voltage is directly proportional to the level of the RF power dissipated by the dummy load 113. Normally, when a transmitter 101 is transmitting or "keyed" the dummy load 113 will dissipate a small amount of RF energy due to minor imperfections in the isolator 105, tuned cavity, combiner junction 109, and the antenna network 111. This establishes the base line efficiency of the transmitter combiner 103 and antenna network 111, which is dependent on the frequency spacing and number of transmitter combiner input ports. Any deviation from this base line indicates a loss of efficiency with the delta directly proportional to the severity of the malfunction. This arrangement is very sensitive to minor RF component degradation without introducing an addition point of failure to the RF system.

An alarm reporting device 117 is used to continually monitors the DC voltages rectified by the RF detector 115. The alarm reporting device is typically one of more computer systems that include a plurality of analog-to-digital (A/D) converters 119 that utilize the analog control signal or data presented by the RF detector 115 and convert it to digital information or digital control signal for use by the alarm reporting device. The alarm reporting device can measure information received at the RF detector 115, test data against predetermined thresholds, analyze the nature of the faults, determine most probable location of the fault, and provide an annunciation or alarm, system impact, recommend course of action to correct the fault to the system operator then track the repair activity until the equipment is restored to nominal performance.

To summarize, the monitoring system 100 according to the present invention samples the energy to the combiner's radio frequency (RF) load 113. This is a departure from radio monitoring systems of the prior art where generally some type of power coupler measures the total RF output going to the antenna system. The RF measured at the RF load 113 is reflected or "waste" energy in the RF transmit network therefore a direct indication of the antennas systems efficiency. The transmit combiner 103 performance is directly linked to the amount of energy that is wasted or reflect back from the antenna system 111. By monitoring the wasted power, the performance of a transmit combiner 103 can be evaluated and an annunciation can be made by a monitoring system 117 if any power anomalies are observed outside a predetermined range.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An automated transmit combiner monitoring system for any RF transmitter system comprising:

at least one transmitter for providing a primary source of radio frequency (RF) energy;

at least one isolator network for isolating the output of the at least one transmitter from secondary sources of RF energy;

a transmitter combiner junction for enabling the at least one transmitter to provide RF energy to a single antenna;

at least one dummy load for loading RF energy from the at least one transmitter that is received from the isolator network;

at least one RF detector for measuring RF energy from the at least one dummy load; and an alarm reporting device for providing an alert based on a predetermined condition from RF energy measured by the at least one RF detector.

2. An automated transmit combiner monitoring system as in claim 1, wherein the isolator network comprises:

an RF isolator; and at least one tuned cavity for matching the RF isolator to the transmitter combiner junction.

3. An automated transmit combiner monitoring system as in claim 1, wherein the at least one dummy load includes a sampling port for connection to the at least one RF detector.

4. An automated transmit combiner monitoring system as in claim 1, wherein the alarm reporting device includes an analog-to-digital converter for converting information from the at least one RF detector for use with a computer system.

5. A transmit combiner system for enabling the monitoring of system anomalies in a two-way radio communications systems comprising:

a plurality of radio frequency (RF) transmitters for providing a plurality of sources of RF energy;

a transmit combiner for enabling the output of each of the plurality of RF transmitters to be combined into a single antenna system;

a plurality of RF detectors attached to the transmit combiner for measuring RF energy reflected back from the single antenna system; and an alarm reporting device for monitoring the plurality of RF detectors and providing an annunciation when the RF detector is outside a predetermined range.

6. A transmit combiner system as in claim 5, wherein the transmit combiner comprises:

at least one isolator for isolating RF energy from returning back to one transmitter of the plurality of transmitters;

at least one tuned cavity for providing a matched impedance output for the at least one isolator;

a combiner junction for combining an output of the at least one tuned cavity and supplying the output to the single antenna system; and at least one RF load connected to the at least one isolator for sampling RF energy propagating through the at least one isolator.

7. A transmit combiner system as in claim 5, wherein the RF detector is attached to a sampling port in at least one RF load.

8. A transmit combiner system as in claim 5, wherein the alarm reporting device includes at least one analog-to-digital converter for converting analog information from the plurality of RF detectors and supplying digital information to a computer system.

9. A method for monitoring a transmit combiner used in a two-way radio system comprising the steps of:

providing at least one radio frequency (RF) signal from a plurality of transmitters;

combining the at least one RF signal at a transmit combiner to a single antenna system;

detecting each of the at least one RF signal from the transmit combiner to provide a plurality of control signals;

monitoring the control signals using an alarm reporting device; and providing an annunciation if the control signals are outside a predetermined range.

10. A method for monitoring a transmit combiner as in claim 9 wherein the step of combining includes the steps of:

isolating the at least one RF signal within an isolation device to prevent reflected RF energy from being present to the plurality of transmitters;

matching isolating device to a combiner junction using a tuned cavity;

feeding all of the at least one RF signal to the combiner junction;

outputting all of the at least one RF signal to the single antenna network.

11. A method for monitoring a transmit combiner as in claim 9, wherein the step of detecting includes the steps of:

utilizing a RF load at an isolating device for providing a load for reflected RF energy; and sampling the reflected RF energy at the RF load to provide the monitored signal.

12. A method for monitoring a transmit combiner as in claim 9, wherein the step of monitoring includes the steps of:

converting an analog control signal at the transmit combiner to a digital control signal for use by the alarm reporting device.

* * * * *